3,000,850
BRIDGED RING PHOSPHITE STABILIZERS FOR VINYL RESINS

Bruce S. Ainsworth, Jr., Mountain Lake, N.J., assignor to Celanese Corporation of America, New York, N.Y., a corporation of Delaware
No Drawing. Filed Aug. 10, 1959, Ser. No. 832,442
16 Claims. (Cl. 260—45.7)

This invention relates to halogenated vinyl resins which are stabilized to heat. More particularly, it relates to the stabilization of polyvinyl halide resins utilizing novel bridged-ring phosphite esters.

As is known, halogenated vinyl resins, such as polyvinyl chloride, are readily degraded by heat. Halogenated vinyl resins have a tendency to degrade at elevated temperatures with the production of hydrogen halides which catalyze further degradation. Attempts have been made (with varying degrees of success) to overcome this inherent disadvantage.

Accordingly, it is an object of the present invention to provide for the effective heat stabilization of halogenated vinyl resins. It is a further object to provide heat stabilized halogenated vinyl resins suitable for use in industry. Other objects and advantages will appear from the ensuing detailed description and claims.

To these ends, small amounts of a novel bridged-ring phosphite ester are added to a halogenated vinyl resin. Illustrative bridged-ring phosphite esters are as follows:

> Trimethylolethane phosphite
> Trimethylolpropane phosphite
> Trimethylolbutane phosphite
> Pentaerythritol phosphite It is a particular advantage of the present invention that small amounts of the bridged-ring phosphite may be incorporated in a halogenated vinyl resin. In general, the amount added to the vinyl resin can be widely varied between 0.1% to about 10%, based on the weight of resin, usually from 0.5% to 1.5% has been found most effective. The halogenated vinyl resins of the type with which the present invention is concerned include the homopolymers of vinyl chloride and vinylidene chloride and copolymers in which these monomers are the major (by weight) constituents, including vinyl chloride-vinyl acetate copolymers and vinyl chloride-vinylidene chloride copolymers. Such resins are severely and rapidly discolored at elevated temperatures in the range of 325° F. to 350° F. Surprisingly, these resins when admixed with the novel bridged-ring phosphites remain substantially unaffected by the latter temperatures over a prolonged period of time.

In addition to the halogenated vinyl resins and the bridged-ring phosphites, the compositions of this invention may include other ingredients including other stabilizers, plasticizers, fillers and pigments. Stabilizers comprising alkaline earth metal soaps and particularly barium-cadmium soaps such as co-precipitated barium-cadmium laurate are particularly useful in combination with the bridged-ring phosphites. Not only do the bridged ring phosphites stabilize the resins but they enhance the stabilizing action of alkaline earth metal soaps by chelating the metallic contaminant which would otherwise interfere with the stabilizing action of the soap.

Alkaline earth metal soaps, when included, are suitably used in proportions between about 1 and 3 percent.

Suitable plasticizers include dialkyl phthalates and triaryl phosphates.

To facilitate a further understanding of the invention, the following examples are given for purposes of illustrating the more specific details hereof. The scope of the invention is not deemed limited thereby except as defined in the claims. Unless otherwise noted, the parts are by weight.

PREPARATION OF THE BRIDGED RING PHOSPHITES

Example A 536 parts (4 moles) of 1,1,1-trimethylolpropane, 1240 parts (4 moles) of triphenyl phosphite and 1 part of metallic sodium were charged to a reactor fitted with a 20 tray distillation column. The mixture was maintained under a subatmospheric pressure of 44 mm. Hg A and heated. 80% of the distillate from the column was returned to the top of the column as reflux. The heating under the subatmospheric pressuree was continued while distillation occurred. There were obtained 1065.7 parts of a first distillation cut, consisting of phenol, followed by 35.9 parts of an intermediate cut, containing 11.9 parts of phenol and 24.0 parts of bridged ring trimethylolpropane phosphite. The last cut, in amount of 585 parts, was bridged-ring trimethylolpropane phosphite.

The recovered bridged-ring trimethylolpropane phosphite was a solid having a melting point of 44.0–45.5° C. and a boiling point of 114° C. at 14 mm. Hg A and 133° C. at 30 mm. Hg A. By saponification, it was assayed at 98.5% pure.

Example B

Example A was repeated, using 480 parts (4 moles) of trimethylolethane, in place of the trimethylolpropane. Distillation yielded a first cut of substantially pure phenol, a second cut of mixed phenol and bridged-ring trimethylolethane phosphite and last cut of trimethylolethane phosphite. These distillates were then all charged to a flask connected to a 20 tray Oldershaw distillation column, fitted with a takeoff head set for 75% reflux and there subjected to a fractional distillation to produce a cut of pure phenol (64.7% of charge) and a small "riser" cut containing trimethylolethane phosphite and phenol. The flask containing the residue, which was principally trimethylolethane phosphite, was then connected to a one plate vacuum still to produce a distillate (30.3% of the charge) of trimethylolethane phosphite. Including trimethylolethane phosphite recovered from the "riser" cut, the yield of trimethylolethane phosphite was 96.1% of the theoretical. The trimethylolethane phosphite was a colorless liquid, freezing at about 90° C. to a white solid with a marked tendency to sublime in long needles; its odor closely resembled that of the material of Example A. Its assay by saponification was 95.5%. Its boiling point was 155° C. at 174 mm. Hg A.

Example C

Equimolecular proportions of pentaerythritol and triphenyl phosphite were placed in a distillation flask connected to a Vigreux column, vacuum pump and receiver. A piece of sodium metal was added, the flask heated and the reaction products distilled over. Phenol distilled first, followed by the pentaerythritol phosphite, separation being very good due to the wide difference in boiling points. The bridged ring pentaerythritol phosphite thus obtained was a colorless, crystalline solid, which had a melting point of 62.4–64.4° C. and a boiling point of 143–144° C. at 2.5 mm. Hg A. Its formula is:

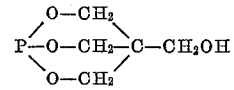

The yield was practically quantitative.

It will be seen that the bridged-ring phosphites are characterized by the structure:

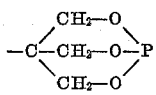

and may be made by the transesterification reaction of an appropriate phosphite triester with a polyhydric alcohol, in the presence of a transesterification catalyst. In general, the proportions of the phosphite triester to the polyhydric alcohol are such as to provide about 1 atom of phosphorus for each 1,1-di(hydroxymethyl)-2-hydroxyethyl group.

In the above specific examples the 1,1-di(hydroxymethyl-2-hydroxyethyl group is attached to an ethyl, methyl, or hydroxymethyl radical, but this group may instead be attached to another radical or atom, such as another alkyl (e.g. butyl), hydrogen, an aryl radical (e.g. phenyl or benzyl), an amino group (e.g. to form the bridged-ring phosphite of aminotrimethylolmethane) or a nitro group (e.g. to form the bridged-ring phosphite of nitrotimethylolmethane). Compounds having a plurality of 1,1-di(hydroxymethyl)-2-hydroxyethyl groups (e.g. dipentaerythritol) may be used to form phosphites containing a plurality of bridged-ring phosphite groups.

The foregoing bridged-ring phosphites may be utilized in the following manner:

Example I

To 100 parts of polyvinyl chloride homopolymer is added 45 parts of di(2-ethyl hexyl) phthalate, 1.5 parts of coprecipitated barium-cadmium laurates and 0.5 part of the phosphite of Example A. The formulation was milled on a chrome plated 2-roll mill to a film thickness of about 50 mils. It was milled for a period of 10 minutes after banding had begun.

Exposure of a sample of the film to heat at 350° F. did not discolor the thus-prepared stabilized resin. Only after exposure at 350° F. for more than about 90 minutes was severe discoloration detected. A sample of film prepared in an identical manner but omitting the phosphite became severely discolored in 45 minutes.

Example II

Example I is repeated except that 0.1 part of the phosphite of Example B is substituted in lieu of the phosphite of Example A.

Example III

Example II is repeated except that 0.8 part of the phosphite of Example C is substituted in lieu of the phosphite of Example B.

It is to be understood that the foregoing detailed description is merely given by way of illustration and that many variations may be made therein without departing from the spirit of my invention.

Having described my invention, what I desire to secure by Letters Patent is:

1. In a process for stabilizing a halogenated vinyl resin against heat degradation the steps which comprise admixing said vinyl resin and a small amount of a bridged-ring phosphite ester having a carbon atom directly attached to the carbon atoms of three oxymethylene groups and each of the oxygen atoms of said three oxymethylene groups being directly attached to the same trivalent phosphorus atom.

2. The method of claim 1 wherein of from 0.1% to 10% of the phosphite ester based on the weight of the vinyl resin is added.

3. The method of claim 1 wherein the vinyl resin is polyvinyl chloride.

4. The method of claim 1 wherein the bridged-ring phosphite esters is trimethylolethane phosphite.

5. The method of claim 1 wherein the bridged-ring phosphite ester is pentaerythritol phosphite.

6. The method of claim 1 wherein the bridged-ring phosphite ester is trimethylolpropane phosphite.

7. In a process for stabilizing a halogenated vinyl resin against heat degradation the steps which comprise admixing said vinyl resin, a small amount of an alkaline earth metal soap and a small amount of a bridged-ring phosphite ester having a carbon atom directly attached to the carbon atoms of three oxymethylene groups and each of the oxygen atoms of said three oxymethylene groups being directly attached to the same trivalent phosphorus atom.

8. The method of claim 7 wherein from 0.5% to 5% of the alkaline earth metal soap and from 0.1% to 10% of the phosphite ester, both based on the weight of resin, are added.

9. The method of claim 7 wherein said alkaline earth metal soap is a coprecipitated soap of barium and cadmium.

10. The method of claim 9 wherein said phosphate ester is trimethylolpropane phosphite.

11. A stabilized halogenated vinyl resin containing a small amount of a bridged-ring phosphite ester having a carbon atom directly attached to the carbon atoms of three oxymethylene groups and each of the oxygen atoms of said three oxymethylene groups being directly attached to the same trivalent phosphorus atom.

12. A stabilized polyvinyl chloride containing a small amount of a bridged-ring phosphite ester having a carbon atom directly attached to the carbon atoms of three oxymethylene groups and each of the oxygen atoms of said three oxymethylene groups being directly attached to the same trivalent phosphorus atom.

13. A stabilized halogenated vinyl resin containing from 0.1% to 10% by weight of trimethylolpropane phosphite.

14. A stabilized halogenated vinyl resin containing from 0.1% to 10% by weight of trimethylolethane phosphite.

15. A stabilized halogenated vinyl resin containing from 0.1% to 10% by weight of pentaerythritol phosphite.

16. A stabilized halogenated vinyl resin containing a small amount of a bridged-ring phosphite ester having a carbon atom directly attached to the carbon atoms of three oxymethylene groups and each of the oxygen atoms of said three oxymethylene groups being directly attached to the same trivalent phosphorus atom and an alkaline earth soap.

References Cited in the file of this patent

UNITED STATES PATENTS

| | | |
|---|---|---|
| 2,456,216 | Richter | Dec. 14, 1948 |
| 2,643,261 | Matuszak et al. | June 23, 1953 |
| 2,752,319 | Zipke et al. | June 26, 1956 |
| 2,834,798 | Hechenbleikner et al. | May 13, 1958 |
| 2,841,606 | Hechenbleikner et al. | July 1, 1958 |
| 2,841,608 | Hechenbleikner et al. | July 1, 1958 |
| 2,867,594 | Hansel et al. | Jan. 6, 1959 |

FOREIGN PATENTS

| | | |
|---|---|---|
| 1,119,752 | France | Apr. 9, 1956 |

Notice of Adverse Decision in Interference

In Interference No. 94,001 involving Patent No. 3,000,850, B. S. Ainsworth, Jr., BRIDGED RING PHOSPHITE STABILIZERS FOR VINYL RESINS, final judgment adverse to the patentee was rendered Dec. 8, 1965, as to claims 1, 3, 4, 5, 6, 11, 12, 13, 14 and 15.

[*Official Gazette February 15, 1966.*]